US010977747B2

(12) United States Patent
Blumofe et al.

(10) Patent No.: US 10,977,747 B2
(45) Date of Patent: Apr. 13, 2021

(54) EXTENDING A CONTENT DELIVERY NETWORK (CDN) INTO A MOBILE OR WIRELINE NETWORK

(75) Inventors: Robert D. Blumofe, Cambridge, MA (US); Vinay Kanitkar, Somerville, MA (US); Dane S. Walther, Cambridge, MA (US); Charles E. Gero, Quincy, MA (US)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 113 days.

(21) Appl. No.: 13/164,102

(22) Filed: Jun. 20, 2011

(65) Prior Publication Data

US 2012/0096106 A1 Apr. 19, 2012

Related U.S. Application Data

(60) Provisional application No. 61/356,306, filed on Jun. 18, 2010.

(51) Int. Cl.
  *G06F 15/16* (2006.01)
  *G06Q 50/00* (2012.01)
  *H04L 29/08* (2006.01)

(52) U.S. Cl.
  CPC ............ *G06Q 50/00* (2013.01); *H04L 67/06* (2013.01); *H04L 67/2814* (2013.01); *H04L 67/2842* (2013.01)

(58) Field of Classification Search
  CPC ............... H04L 29/08072; H04L 29/06; H04L 29/08549; H04L 67/2814; H04L 67/2842
  See application file for complete search history.

(56) References Cited

U.S. PATENT DOCUMENTS

| 5,424,770 A | 6/1995 | Schmelzer et al. |
| 5,534,944 A | 7/1996 | Egawa et al. |
| 5,805,804 A | 9/1998 | Laursen et al. |

(Continued)

FOREIGN PATENT DOCUMENTS

| CN | 101242422 | 2/2007 |
| CN | 101681331 A | 3/2010 |

(Continued)

OTHER PUBLICATIONS

WIPO International Search Report for PCT/US2011/041069, dated Jan. 18, 2012, 5 pages.

(Continued)

*Primary Examiner* — Bryan Lee

(57) ABSTRACT

A content delivery network (CDN) comprises a set of edge servers, and a domain name service (DNS) that is authoritative for content provider domains served by the CDN. The CDN is extended into one or more mobile or wireline networks that cannot or do not otherwise support fully-managed CDN edge servers. In particular, an "Extender" is deployed in the mobile or wireline network, preferably as a passive web caching proxy that is beyond the edge of the CDN but that serves CDN-provisioned content under the control of the CDN. The Extender may also be used to transparently cache and serve non-CDN content. An information channel is established between the Extender and the CDN to facilitate the Extender functionality.

15 Claims, 5 Drawing Sheets

(56) References Cited

U.S. PATENT DOCUMENTS

| | | |
|---|---|---|
| 5,859,660 A | 1/1999 | Perkins et al. |
| 5,878,220 A | 3/1999 | Olkin et al. |
| 6,108,703 A | 8/2000 | Leighton et al. |
| 6,154,496 A | 11/2000 | Radha |
| 6,480,539 B1 | 11/2002 | Ramaswamy |
| 6,542,964 B1 | 4/2003 | Scharber |
| 6,566,541 B2 | 5/2003 | Liu et al. |
| 6,567,471 B1 | 5/2003 | Yoshinari |
| 6,636,512 B1 | 10/2003 | Lorrain et al. |
| 6,657,991 B1 | 12/2003 | Akgun et al. |
| 6,693,907 B1 | 2/2004 | Wesley et al. |
| 6,711,607 B1 | 3/2004 | Goyal |
| 6,875,704 B2 | 4/2005 | Baek et al. |
| 6,912,251 B1 | 6/2005 | Ward et al. |
| 6,944,585 B1 | 9/2005 | Pawson |
| 7,010,578 B1 * | 3/2006 | Lewin et al. ............. 709/217 |
| 7,096,418 B1 | 8/2006 | Singhal |
| 7,107,309 B1 | 9/2006 | Geddes et al. |
| 7,111,057 B1 | 9/2006 | Sherman et al. |
| 7,133,905 B2 | 11/2006 | Dilley |
| 7,149,797 B1 | 12/2006 | Weller et al. |
| 7,240,100 B1 | 7/2007 | Wein et al. |
| 7,251,688 B2 | 7/2007 | Leighton et al. |
| 7,260,598 B1 | 8/2007 | Liskov et al. |
| 7,274,658 B2 * | 9/2007 | Bornstein et al. ............. 370/227 |
| 7,289,519 B1 | 10/2007 | Liskov |
| 7,305,479 B1 | 12/2007 | Morris et al. |
| 7,343,485 B1 | 3/2008 | Huang et al. |
| 7,376,716 B2 | 5/2008 | Dilley et al. |
| 7,395,355 B2 | 7/2008 | Afergan et al. |
| 7,472,178 B2 | 12/2008 | Lisiecki et al. |
| 7,502,836 B1 * | 3/2009 | Menditto et al. ............. 709/217 |
| 7,561,515 B2 | 7/2009 | Ross |
| 7,562,153 B2 | 7/2009 | Biliris et al. |
| 7,600,025 B2 * | 10/2009 | Lewin et al. ............. 709/226 |
| 7,653,703 B2 | 1/2010 | Toumura |
| 7,660,296 B2 | 2/2010 | Fletcher et al. |
| 7,734,730 B2 | 6/2010 | McCanne |
| 7,752,258 B2 | 7/2010 | Lewin et al. |
| 7,761,570 B1 | 7/2010 | Halley |
| 7,787,416 B2 | 8/2010 | Gidwani et al. |
| 7,822,871 B2 | 10/2010 | Salmon et al. |
| 7,860,964 B2 | 12/2010 | Brady et al. |
| 7,933,247 B2 | 4/2011 | Gidwani |
| 8,117,276 B1 | 2/2012 | Sakata et al. |
| 8,122,102 B2 | 2/2012 | Wein et al. |
| 8,141,156 B1 | 3/2012 | Mao et al. |
| 8,166,108 B1 | 4/2012 | Peters |
| 8,190,702 B1 | 5/2012 | Sakata et al. |
| 8,239,571 B2 * | 8/2012 | Sivasubramanian et al. ................ 709/238 |
| 8,245,037 B1 | 8/2012 | Durgin et al. |
| 8,266,327 B2 | 9/2012 | Kumar et al. |
| 8,275,851 B1 | 9/2012 | Sakata et al. |
| 8,332,484 B2 | 12/2012 | Afergan et al. |
| 8,417,816 B2 | 4/2013 | Esteban et al. |
| 8,443,052 B2 | 5/2013 | Esteban et al. |
| 8,504,642 B2 | 8/2013 | Sakata et al. |
| 8,543,700 B1 * | 9/2013 | Randall et al. ............. 709/226 |
| 8,549,598 B2 | 10/2013 | Tsujimoto et al. |
| 8,856,322 B2 | 10/2014 | Dare et al. |
| 8,948,200 B2 | 2/2015 | Alt et al. |
| 9,137,739 B2 | 9/2015 | Raleigh |
| 9,154,734 B2 | 10/2015 | Jang |
| 9,178,969 B2 | 11/2015 | Berman |
| 2002/0027886 A1 | 3/2002 | Fischer et al. |
| 2002/0065073 A1 | 5/2002 | Natani et al. |
| 2002/0065899 A1 * | 5/2002 | Smith ............. G06F 17/30893 709/214 |
| 2002/0080886 A1 | 6/2002 | Ptasinski et al. |
| 2002/0161835 A1 | 10/2002 | Ball et al. |
| 2003/0145066 A1 | 7/2003 | Okada et al. |
| 2003/0206559 A1 | 11/2003 | Trachewsky et al. |
| 2004/0015725 A1 | 1/2004 | Boneh et al. |
| 2004/0093419 A1 | 5/2004 | Kagan et al. |
| 2004/0167981 A1 | 8/2004 | Douglas et al. |
| 2004/0205162 A1 | 10/2004 | Parikh |
| 2004/0243704 A1 | 12/2004 | Botelho et al. |
| 2005/0223107 A1 | 10/2005 | Mine et al. |
| 2005/0256873 A1 | 11/2005 | Walker et al. |
| 2006/0023709 A1 | 2/2006 | Hall et al. |
| 2006/0036730 A1 | 2/2006 | Graham et al. |
| 2006/0104230 A1 | 5/2006 | Gidwani |
| 2006/0143293 A1 | 6/2006 | Freedman |
| 2006/0168088 A1 | 7/2006 | Leighton et al. |
| 2006/0174035 A1 | 8/2006 | Tufail |
| 2006/0206568 A1 | 9/2006 | Verma et al. |
| 2006/0271559 A1 * | 11/2006 | Stavrakos ......... G06F 17/30902 |
| 2006/0282522 A1 | 12/2006 | Lewin et al. |
| 2007/0005689 A1 | 1/2007 | Leighton et al. |
| 2007/0038994 A1 | 2/2007 | Davis et al. |
| 2007/0047568 A1 * | 3/2007 | Wang ................ G06Q 10/087 370/429 |
| 2007/0055765 A1 | 3/2007 | Lisiecki et al. |
| 2007/0055984 A1 | 3/2007 | Schiller et al. |
| 2007/0097885 A1 | 5/2007 | Traversat et al. |
| 2007/0156845 A1 | 7/2007 | Devanneaux et al. |
| 2007/0180099 A1 | 8/2007 | Tsimelzon et al. |
| 2007/0250560 A1 | 10/2007 | Wein et al. |
| 2007/0288588 A1 | 12/2007 | Wein et al. |
| 2008/0046596 A1 | 2/2008 | Afergan et al. |
| 2008/0215750 A1 * | 9/2008 | Farber et al. ............... 709/233 |
| 2008/0228939 A1 | 9/2008 | Samuels et al. |
| 2008/0262990 A1 | 10/2008 | Kapoor et al. |
| 2008/0263180 A1 | 10/2008 | Hurst et al. |
| 2008/0320225 A1 * | 12/2008 | Panzer ............. G06F 17/30902 711/130 |
| 2009/0083811 A1 | 3/2009 | Dolce et al. |
| 2009/0083813 A1 | 3/2009 | Dolce et al. |
| 2009/0156171 A1 * | 6/2009 | Yasrebi ................ H04L 51/36 455/412.2 |
| 2009/0169005 A1 | 7/2009 | Meyer et al. |
| 2009/0182843 A1 | 7/2009 | Hluchyj et al. |
| 2009/0210528 A1 | 8/2009 | Swildens et al. |
| 2009/0217362 A1 * | 8/2009 | Nanda .................. G06F 21/33 726/5 |
| 2010/0005146 A1 * | 1/2010 | Drako .................. G06Q 10/00 709/206 |
| 2010/0036725 A1 * | 2/2010 | Turakhia ................. 705/14.39 |
| 2010/0125649 A1 | 5/2010 | Day et al. |
| 2010/0332589 A1 | 12/2010 | Schwimer |
| 2011/0119724 A1 | 5/2011 | Damola et al. |
| 2011/0145386 A1 | 6/2011 | Stolorz et al. |
| 2011/0219109 A1 * | 9/2011 | Zehavi .............. H04L 29/08729 709/223 |
| 2012/0096106 A1 | 4/2012 | Blumofe et al. |
| 2012/0209942 A1 | 8/2012 | Zehavi et al. |
| 2012/0240176 A1 | 9/2012 | Ma et al. |
| 2012/0265892 A1 | 10/2012 | Ma et al. |
| 2013/0046664 A1 | 2/2013 | Kazerani et al. |
| 2013/0046883 A1 | 2/2013 | Lientz et al. |
| 2013/0232210 A1 | 9/2013 | Hluchyj |
| 2013/0347116 A1 | 12/2013 | Flores et al. |
| 2014/0108609 A1 | 4/2014 | Vu Duong et al. |
| 2014/0189069 A1 * | 7/2014 | Gero et al. ................ 709/219 |
| 2014/0245359 A1 | 8/2014 | De Foy et al. |
| 2014/0304765 A1 | 10/2014 | Nakamoto et al. |
| 2015/0222487 A1 | 8/2015 | Ranjekar |

FOREIGN PATENT DOCUMENTS

| | | |
|---|---|---|
| EP | 0755157 | 1/1997 |
| EP | 0772360 | 5/1997 |
| EP | 1115252 | 7/2001 |
| EP | 1365587 | 11/2003 |
| EP | 1533970 A1 | 5/2005 |
| EP | 1655963 | 5/2006 |
| EP | 1986400 A1 | 10/2008 |
| EP | 2706753 | 3/2014 |
| GB | 2430591 A | 3/2007 |
| KR | 10-2001-0074186 | 8/2001 |
| KR | 10-2001-0074186 A | 8/2001 |
| KR | 10-2010-0050594 | 5/2010 |

(56) References Cited

FOREIGN PATENT DOCUMENTS

| KR | 10-2010-0050594 A | 5/2010 |
|---|---|---|
| WO | WO2001056285 | 8/2001 |
| WO | WO/2002/009425 | 1/2002 |
| WO | WO03088065 | 10/2003 |
| WO | WO2010049876 | 5/2010 |
| WO | WO2010049876 A2 | 5/2010 |
| WO | WO2011160113 | 12/2011 |

OTHER PUBLICATIONS

WIPO Written Opinion for PCT/US2011/041069, dated Jan. 18, 2012, 5 pages.
Blake-Wilson et al., RFC 3546, Transport Layer Security Extensions, Jun. 2003, 27 pages.
WIPO International Search Report for PCT/IB2009/054727, dated May 6, 2010, 4 pages.
WIPO Written Opinion for PCT/IB2009/054727, dated Jul. 14, 2010, 4 pages.
WIPO International Search Report for PCT/US2011/41069, dated May 6, 2010, 4 pages.
U.S. Appl. No. 13/126,688.
U.S. Appl. No. 13/102,038.
U.S. Appl. No. 13/164,102.
WIPO International Search Report for PCT/US2012/036712, dated Nov. 20, 2012, 6 pages.
WIPO Written Opinion for PCT/US2012/036712, dated Nov. 20, 2012, 5 pages.
USPTO Office Action for U.S. Appl. No. 13/126,688, dated Sep. 27, 2012.
WIPO International Search Report for PCT/US2012/036712, dated Nov. 23, 2012, 6 pages.
WIPO Written Opinion for PCT/US2012/036712, dated Nov. 23, 2012, 5 pages.
U.S. Appl. No. 13/857,451, filed Apr. 5, 2013.
U.S. Appl. No. 13/126,688 Non-Final Office Action dated Mar. 4, 2013, 44 pages.
U.S. Appl. No. 13/102,038 Non-Final Office Action dated Mar. 4, 2013, 48 pages.
U.S. Appl. No. 13/126,688 Final Office Action dated Dec. 20, 2013, 29 pages.
U.S. Appl. No. 13/102,038 Final Office Action dated Dec. 24, 2013, 62 pages.
Extended EU Search Report for counterpart Application No. EP11796575, including Supplementary European Search Report and European search opinion, dated Mar. 9, 2015, 6 pages.
Day et al., IETF RFC 3466, A Model for Content Internetworking (CDI), Feb. 2003, 17 pages.
Office Action for counterpart JP Application No. 2013-515578, Office action dated May 28, 2015, 4 pages (translation at end).
NTT Technical Journal, "Name Resolution Technique to Achieve Simultaneous Connections to a Plurality of Networks", Nov. 1, 2003, pp. 34-37, vol. 15, No. 11 of NTT Technical Journal, 12 pages (translation.
Office Action for Chinese counterpart, Application No. 201180029965.8, dated Feb. 27, 2015, 8 pages (translation at end).
51st IETF—Content Distribution Internet Working BOF (cdi), IETF—announce thread from agenda@ietf.org, Jul. 2001, 2 pages.
Information Week, Content Bridge Alliance to Take on Industry Leader Akamai, online press release dated Aug. 24, 2000, 5 pages.
Day, M. et al., Content Distribution Network Peering Scenarios, draft-day-cdnp-scenarios-00.txt, Internet-Draft, Network Working Group, Sep. 26, 2000, 15 pages.
Day, M. et al., Content Distribution Network Peering Scenarios, draft-day-cdnp-scenarios-02.txt, Internet-Draft, Network Working Group, Nov. 8, 2000, 18 pages.
Day, M. et al., Content Distribution Network Peering Scenarios, draft-day-cdnp-scenarios-03.txt, Internet-Draft, Network Working Group, Mar. 2001, 16 pages.
Day, M. et al., Content Distribution Network Peering Scenarios, draft-day-cdnp-scenarios-04.txt, Internet-Draft, Network Working Group, Nov. 6, 2001, 17 pages.
Day, M. et al., Content Distribution Network Peering Scenarios, draft-day-cdnp-scenarios-05.txt, Internet-Draft, Network Working Group, Jan. 7, 2002, 17 pages.
Douglis, F. et al., Known Mechanisms for Content Internetworking, draft-douglis-cdi-known-mech-00.txt, Internet-Draft, Network Working Group, Nov. 8, 2001, 25 pages.
Bertrand, G., et al., Use Cases for Content Distribution Network Interconnection, draft-bertrand-cdni-use-cases-00, IETF, Internet Draft, Jan. 13, 2011, 11 pages.
Bertrand, G., et al., Use Cases for Content Distribution Network Interconnection, draft-bertrand-cdni-use-cases-01, IETF, Internet Draft, Jan. 28, 2011, 20 pages.
Niven-Jenkins, B. et al., Content Distribution Network Interconnection (CDNI) Problem Statement, draft-jenkins-cdni-problem-statement-00, Internet Draft, Network Working Group, Dec. 2, 2010, 17 pages.
Niven-Jenkins, B. et al., Content Distribution Network Interconnection (CDNI) Problem Statement, draft-jenkins-cdni-problem-statement-01, Internet Draft, Network Working Group, Jan. 17, 2011, 31 pages.
Niven-Jenkins, B. et al., Content Distribution Network Interconnection (CDNI) Problem Statement, draft-jenkins-cdni-problem-statement-02, Internet Draft, Network Working Group, Mar. 13, 2011, 35 pages.
Le Faucheur, F., et al., Content Distribution Network Interconnection (CDNI) Requirements, draft-lefaucheur-cdni-requirements-00, Internet-Draft, Network Working Group, Jan. 26, 2011, 21 pages.
Le Faucheur, F., et al., Content Distribution Network Interconnection (CDNI) Requirements, draft-lefaucheur-cdni-requirements-01, Internet-Draft, Network Working Group, Mar. 14, 2011, 21 pages.
Day, M. et al., Content Distribution Network Peering Scenarios, draft-day-cdnp-scenarios-01.txt, Internet-Draft, Network Working Group, Sep. 2000, 11 pages.
Gilletti, D., et al., Content Networking (CDI) Authentication, Authorization, and Accounting Requirements, draft-ietf-cdi-aaa-reqs-00.txt, Internet-Draft, Network Working Group, Feb. 2002, 26 pages.
Office Action for U.S. Appl. No. 13/102,038, dated Jan. 16, 2015, 40 pages.
Office Action for U.S. Appl. No. 13/126,688, dated Dec. 10, 2014, 50 pages.
Office Action for U.S. Appl. No. 13/126,688, dated Jul. 15, 2015, 55 pages.
Machine translation of EP2706753 from French to English, available from worldwide.espacenet.com (EPO), 35 pages.
Applicant response to OA filed in U.S. Appl. No. 13/126,688, dated Sep. 4, 2013.
Applicant response to OA filed in U.S. Appl. No. 13/126,688, dated Jun. 20, 2014.
Applicant response to OA filed in U.S. Appl. No. 13/126,688, dated Jun. 10, 2015.
Applicant response to OA filed in U.S. Appl. No. 13/102,038 dated Sep. 4, 2013.
Applicant response to OA filed in U.S. Appl. No. 13/102,038 dated Jun. 24, 2014.
2nd Office Action dated Jan. 18, 2016 for counterpart Chinese Application No. 201180029965.8, 10 pages.
Chinese Application No. 201280021841.X, 1st Office Action dated Mar. 9, 2016, 76 pages.
European Search Opinion and Extended EU Search Report for Application No. 12779877.5, dated Oct. 12, 2015, 8 pages.
Patent Examination Report No. 1 dated Dec. 8, 2015 for counterpart Australian Application 2011268104, 3 pages.
Response to Office Action,for U.S. Appl. No. 13/102,308, dated Jun. 24, 2014, 11 pages.
U.S. Appl. No. 13/126,688, Amendment/Response dated Sep. 4, 2013, 9 pages.
Response to 1st Office Action filed on Nov. 17, 2015 for counterpart Chinese Application No. 201180029965.8, with English translation, 13 pages.

(56) References Cited

OTHER PUBLICATIONS

Response to Extended EU Search Report for counterpart European Patent Application No. 11796575.6, dated Jan. 27, 2016, 9 pages.
Response to OA filed Sep. 14, 2015 w/ translation.
U.S. Appl. No. 13/102,038, Amendment/Response dated Sep. 4, 2013, 14 pages.
U.S. Appl. No. 13/126,688, Amendment/Response dated Jun. 10, 2015, 10 pages.
U.S. Appl. No. 13/126,688, Amendment/Response dated Jun. 20, 2014, 12 pages.
Chinese Application No. 201280021814.X, full translation of First Office Action dated Mar. 9, 2016, 21 pages.
Australian Patent Application No. 2011268104, Amendment filed on Nov. 11, 2016, 4 pages.
Australian Patent Application No. 2011268104, Response to Examiner's Report, filed on Nov. 11, 2016, 50 pages.
Xiwei, Tian , "Master's Dissertation, Research on the Application of the SSL Proxy in the CDN System, Lanzhou University", (Chinese with English translation), Jun. 1, 2009, 114 pages.
Yunfei, Z. et al., "Overview of the CDN Technologies", Essays for Annual Conference 2003 of the Technical Committee of Information Communication Networks, Dissertation No. No. 40, China Academic Journal Electronic Publishing House, 10 pages (English translation and Chinese) http://www.cnki.net, 2003.
Hurst et al., "MPEG Splicing: Tutorial and Proposed Smpte Standard," SMPTE Journal: pp. 1-14 (Nov. 1998).
SCTE 35 (ITU-T J.181): Digital Program Insertin Cueing Message for Cable, pp. 1-37,2004.
U.S. Appl. No. 12/015,490, Method and Apparatus for Dynamic Transmission Rate Adjustment to Support Seamless Splicing of Compressed Video Streams, pp. 1-38, filed Jan. 16, 2008.
Zhang et al., "Integrated Rate Control and Buffer Management for Scalable Video Streaming," Multimedia and Expo, 2007 IEEE International Conference on, IEEE, PI, Jul. 1, 2007, pp. 248-251, XP031123608.
Zhang et al., "Joint Rate Allocation and Buffer Management for Robust Transmission ofVBR Video," Mar. 1, 2008, vol. 34, No. 3, Mar. 1, 2008, pp. 337-343, XP02551681.
"Proxy Server," Wikipedia, Jan. 15, 2008, 7 pages.
"Web cache," Wikipedia, Jan. 9, 2008, 2 pages.
"Reverse Proxy," Wikipedia, Jan. 3, 2008, 2 pages.
Cooper, I., et al. "Known HTTP Proxy/Caching Problems," httu:// tools.ietf.org/html/rfc3143, Jun. 2001, 30 pages.
Cooper, I., et al., "Known HTTP Proxy/Caching Problems," draft-cooper-wrec-known-prob-01.txt, http://tools.ietf.org/html/draft-cooper-wrec-known-prob-01, Apr. 12, 2001, 32 pages.
Cooper, I., et al., "Internet Web Replication and Caching Taxonomy," http://tools.ietf.org/html/rfc3040, Jan. 2001, 30 pages.
Cerpa, A., et al., "NECP the Network Element Control Protocol," http://tools.ietf.org/html/draft-cerpa.necp-02, Feb. 22, 2000, 38 pages.
P. Vixie, et al., "Hyper Text Caching Protocol (HTCP/0.0)," http://tools.ieff.org/html/rfc2756, Jan. 2000, 15 pages.
Field, R., et at. Hypertext Transfer Protocol—HTTP/1.1, http://5ools.ietf.org/html/rfc2616, Jun. 1999, 165 pages.
Kristol, David M., "HTTP Proxy State Management Mechanism," http://tools.ietf.org/html/draft-kristol-http-proxy-state-00, May 26, 1998, 9 pages.
Berners-Lee, T., et at., "Hypertext Transfer Protocol—HTTP/1.0," http://tools.ietf.org/html/rfc1945, May 1996, 57 pages.

International Search Report and Written Opinion for International Application No. PCT/US2009/030495, dated May 4, 2009 (8 pages).
Office Action for Canadian Application No. 2,802,904, dated Apr. 18, 2017, 6 pages.
Wessels, Duane, "Web Caching", OReilly Media Inc., published Jun. 27, 2001, (306 pages, including pp. 33-37).
DS transmittal letter of Apr. 8, 2016 submitted with this SB/08, 2 pages.
Wessels, Duane, "Squid: The Definitive Guide", O'Reilly Media Inc., 1st edition Jan. 2004.
DS transmittal letter of Apr. 11, 2016 submitted with this SB/08, 2 pages.
Korean Application No. 10-2013-7001326, response to Office Action dated Jul. 14, 2017, response filed on Sep. 14, 2017, 5 pages. (and English translation).
First Office Action for Korean patent application 10-2013-7001326, counterpart to current application, dated Jul. 14, 2017, 5 pages (and English translation).
Office Action for Canada patent application 2802904, counterpart to current application, dated Apr. 18, 2017, 6 pages.
Indian 323/CHENP/2013 counterpart to current case, Written Submission To Hearing Held on Jan. 15, 2021, submission dated Jan. 29, 2021, 3 pages.
Brazilian Patent Application No. 1120120323717, counterpart to current application, English Version of the Preliminary Office Action, dated Sep. 24, 2019, 2 pages.
Brazilian Patent Application No. 1120120323717, counterpart to current application, Portuguese Version, Preliminary Office Action dated Sep. 24, 2019, 4 pages.
Brazilian Patent Application No. 1120120323717, counterpart to current application, English Version, Response to Preliminary Office Action dated Dec. 20, 2019, 6 pages.
Brazilian Patent Application No. 1120120323717, counterpart to current application, Portuguese Version, Response to Preliminary Office Action dated Dec. 20, 2019, 13 pages.
Canadian Patent Application No. 2802904, counterpart to current application, Requisition by Examiner, dated May 7, 2018, 4 pages.
Canadian Patent Application No. 2802904, counterpart to current application, response to Examiner's Report dated Oct. 19, 2018, 10 pages.
KR Patent Application No. (PCT) 10-2013-7001326, counterpart to current application, English Version, Final Office Action dated Jan. 2, 2018, 4 pages.
KR Patent Application No. (PCT) 10-2013-7001326, counterpart to current application, Korean Version, Final Office Action dated Jan. 2, 2018, 4 pages.
KR Patent Application No. (PCT) 10-2013-7001326, counterpart to current application, Korean Version, Request for re-exam with an argument and amendment, filed Feb 1, 2018 in, 28 pages.
KR Patent Application No. (PCT) 10-2013-7001326, counterpart to current application, response to Final Office Action dated Feb. 1, 2018, English Version, 12 pages.
India Patent Application No. 323/CHENP/2013, counterpart to current application, Exam Report dated Feb. 22, 2019, 6 pages.
India Patent Application No. 323/CHENP/2013, counterpart to current application, response to Exam Report dated Aug. 21, 2019, 4 pages.
India Patent Application No. 323/CHENP/2013, counterpart to current application, Hearing Notice dated Dec. 19, 2020, 2 pages.

\* cited by examiner dig www.bestbuy.com

;; QUESTION SECTION:
;www.bestbuy.com.          IN      A

;; ANSWER SECTION:
www.bestbuy.com.           2924  IN    CNAME   www.bestbuy.com.edgesuite.net.
www.bestbuy.com.edgesuite.net.  8304  IN    CNAME   a1105.b.akamai.net.

EXTENDING A CONTENT DELIVERY NETWORK (CDN) INTO A MOBILE OR WIRELINE NETWORK

This application is based on Ser. No. 61/356,306, filed Jun. 18, 2010.

BACKGROUND OF THE INVENTION

Technical Field

This application relates generally to extending a content delivery network (CDN) functionality into a network, such as a mobile network, in which it is not practical or possible to provide Internet-based managed CDN services.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties, such as content provider customers. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content, streaming media and applications on behalf of the content providers, including ancillary technologies used therewith such as DNS query handling, provisioning, data monitoring and reporting, content targeting and personalization, and business intelligence.

It is known in the prior art to extend an Internet content delivery network (ICDN) into an enterprise computing environment that may be located behind an enterprise firewall. An example is described in U.S. Pat. No. 7,600,025, which is commonly-owned. It is also known to associate third party caches with a content delivery network in a manner such as described in U.S. Pat. No. 7,010,578, which also is commonly-owned.

Because of the way that fixed or wireless mobile networks are architected and operated, it is not always possible or practical to deploy fully-managed CDN servers therein (i.e., close to end-users). For example, in the case of the dominant 3G mobile technology, UMTS (Universal Mobile Telecommunications System), a mobile device connects over the air to a tower, the towers connect over a terrestrial network called the UTRAN (UMTS Terrestrial Radio Access Network) to the RNCs (Radio Network Controllers), the RNCs connect through the Packet Core to Service Nodes, and the Service Nodes connect through gateways to the Internet. A typical mobile network has only a handful of these Internet gateways, which can be thousands of miles and tens or even hundreds of milliseconds away from the end-users, but these gateways may be the only locations where the CDN's fully-managed servers can be deployed. Beyond these locations, into the Packet Core and the UTRAN, typically it is not possible to deploy a device with a publicly routable IP address and open ports to the Internet.

Wireline networks also typically have a barrier beyond which it is not possible to deploy fully-managed CDN servers. That barrier in wireline networks is generally far deeper, far closer to the end-users, than in the case of mobile networks, but it many cases, it still represents a real impediment to realizing fully the benefits of a CDN or other distributed network. It is also worth noting that even when there is no such technical barrier, often there is a cultural or business barrier. Specifically, many network operators are highly protective of their networks and will not allow a fully-managed device beyond some barrier therein.

BRIEF SUMMARY

A content delivery network (CDN) comprises a set of edge servers, and a domain name service (DNS) that is authoritative for content provider domains served by the CDN. The CDN is extended into one or more mobile or wireline networks that cannot or do not otherwise support fully-managed CDN edge servers. In particular, an "Extender" is deployed in the mobile or wireline network, preferably as a passive web caching proxy that is beyond the edge of the CDN but that serves CDN-provisioned content under the control of the CDN. The Extender may also be used to transparently cache and serve non-CDN content. An information channel is established between the Extender and the CDN to facilitate the Extender functionality.

In one embodiment, the information channel facilitates the following caching method. The method begins upon receipt at the Extender of a request for content. A determination is then made whether the content is of a first type or a second type, the first type being content that is adapted to be delivered over a content delivery network (CDN). If the content is of the first type (CDN content) and is located in the cache, the Extender uses the information channel to obtain a cache handing directive from the CDN. That CDN-supplied directive is then applied and the content is served. If, however, the content is of the second type (non-CDN content), the Extender transparently caches and serves the content in response to the request, but using a cache handling directive received from other than the CDN (e.g., from an origin server).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
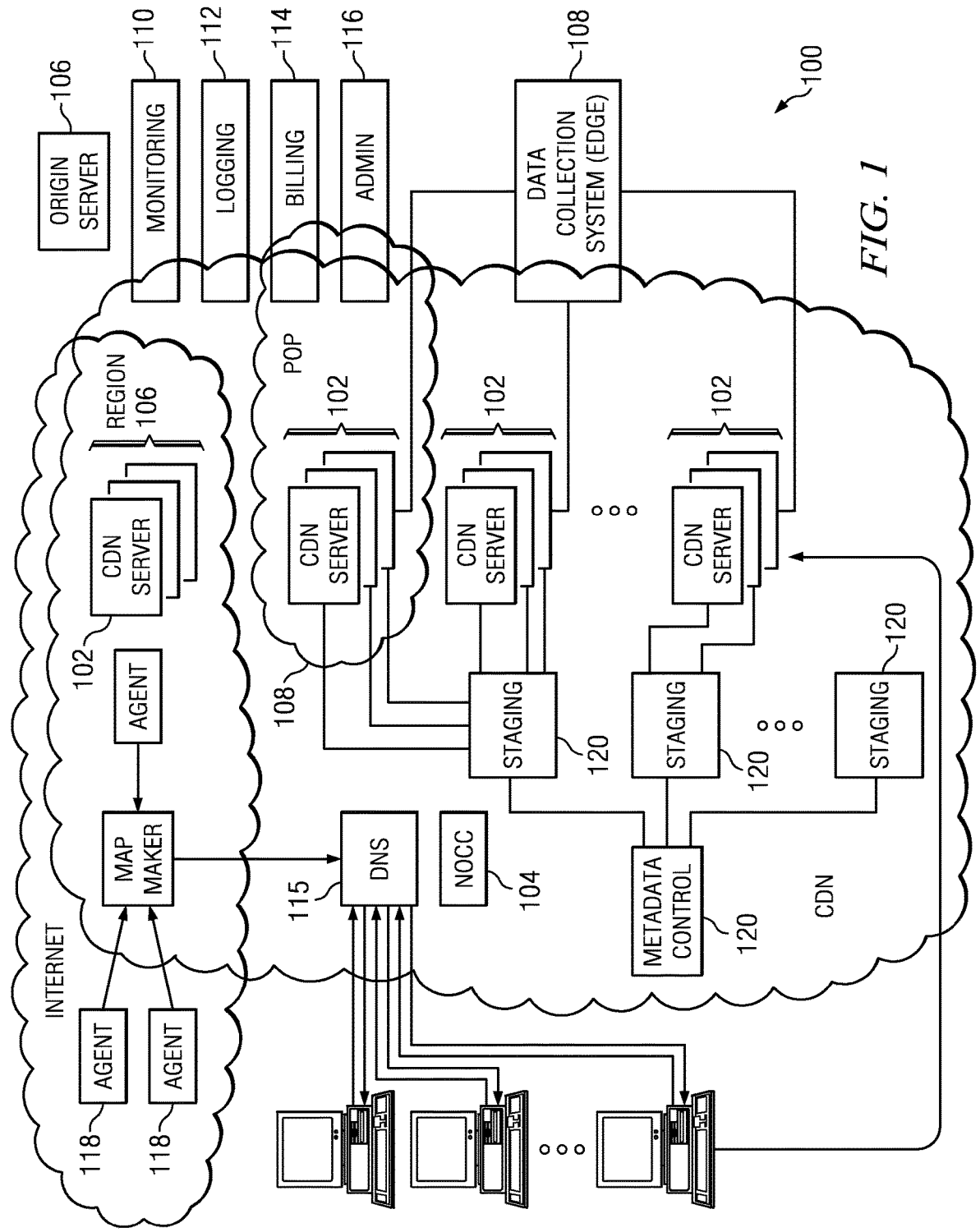
FIG. 1 depicts an exemplary block diagram of a distributed computer system environment in which exemplary aspects of the illustrative embodiments may be implemented.

In a known system, such as shown in FIG. 1, a distributed computer system 100 is configured as a CDN and is assumed to have a set of machines 102*a-n* distributed around the Internet. Typically, most of the machines are servers located near the edge of the Internet, i.e., at or adjacent end-user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to edge traffic domains that are managed by the service provider's authoritative domain name service. End-users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS mechanism 115, which is authoritative for content domains being managed by the CDN. A distributed data transport mechanism 120 may be used to distribute control information (e.g., metadata to manage content, to facilitate load balancing, and the like) to the edge servers.

In one embodiment, the CDN resources described above are implemented as an "overlay" on existing Internet infrastructure (third party networks, co-location facilities, servers, routers, and the like).

Figures 2, 5:
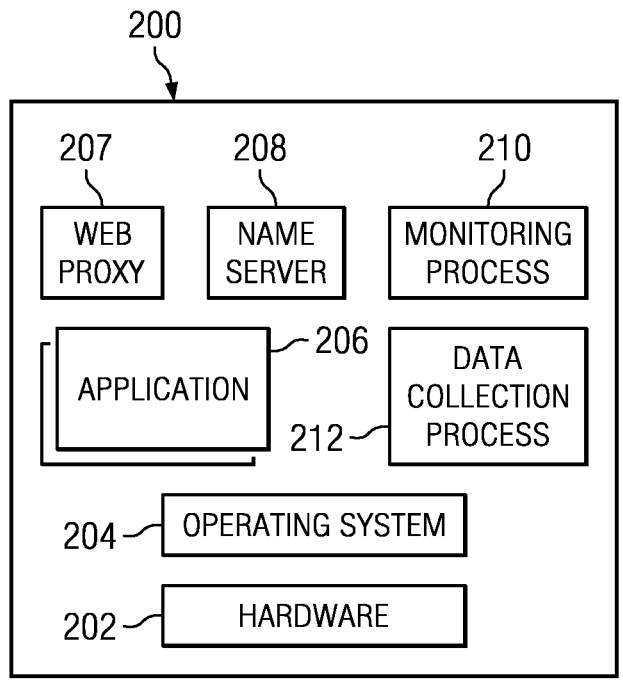
FIG. 2 is an exemplary block diagram of an edge server machine in the content delivery network in FIG. 1.
FIG. 5 is a nameserver lookup operation for use in determining whether a particular domain belongs to a CDN customer.

As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP (web) proxy 207, a nameserver 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server. A technique for applying that content control information to content requests received at the edge server is described in U.S. Pat. No. 7,240,100, the disclosure of which is incorporated by reference. According to that disclosure, a client request is received at the edge server identified by the CDN's authoritative DNS. The client request includes an HTTP host header whose contents are first checked to verify that the request is for content that is being managed by the CDN (and thus might be available in the edge server cache, if the content was previously requested by another and is still present in the cache). If the request is for CDN-managed content, the rules in the XML configuration file are applied to the request, and an appropriate response is returned to the client request.

The CDN may include a storage subsystem, such as described in U.S. Pat. No. 7,472,178. The CDN may operate a server cache hierarchy to provide intermediate caching of customer content; one such cache hierarchy subsystem is described in U.S. Pat. No. 7,376,716. The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

Extender

Figure 3:
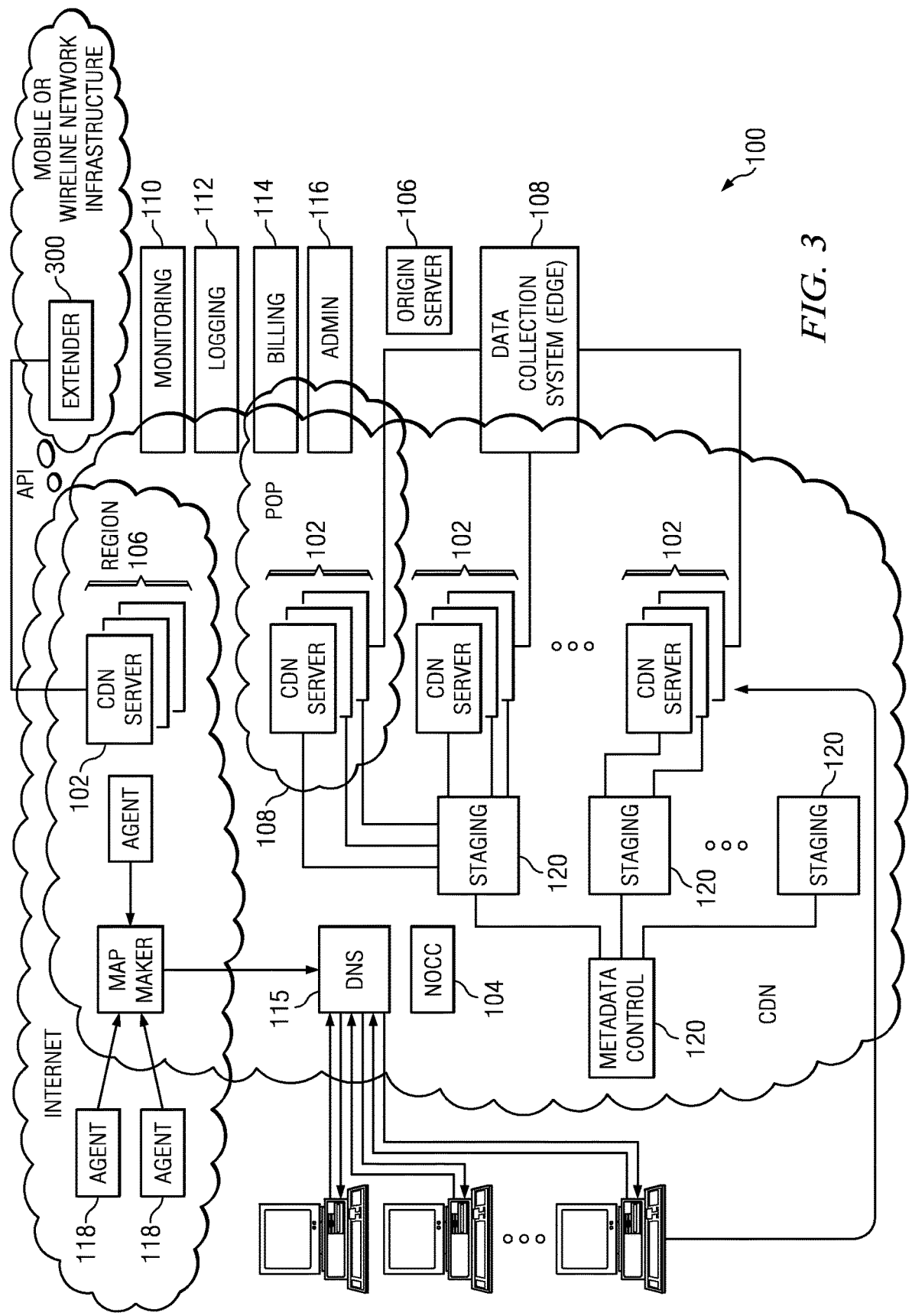
FIG. 3 is a block diagram that illustrates how an Internet content delivery network (CDN) is extended according to the techniques of this disclosure.

With the above as background, the subject matter of this disclosure is now described. According to this disclosure, a CDN "Extender" is a piece of software or a device (such as a rack-mounted appliance comprising such software) that (1) can serve CDN-provisioned content, (2) does so under the control of the CDN, but (3) is not necessarily fully-managed as part of the CDN. These properties are explained below. As seen in FIG. 3, the Extender 300 extends the CDN's delivery capability deeper into networks where it is not possible (for technical or other reasons) to deploy the CDN's fully-managed servers. This capability may be implemented in mobile networks, in wireline networks, or in any other networking environment in or for which CDN overlay network resources and services are not available or realized.

The nomenclature "Extender" is meant for descriptive purposes, and it should not be taken to limit the scope of the disclosed subject matter.

Generalizing, the Extender operates as a passive web caching proxy beyond the edge of the CDN. Typically, the Extender does not have direct access to customer configuration metadata in the CDN, and it interacts with the CDN by forwarding requests to the CDN edge and caching/serving content based on response headers received from the edge.

Preferably, the Extender need not be fully-managed as part of the CDN, although the Extender takes advantage of certain functionalities therein, as will be described. Thus, the Extender need not have a publicly-routable Internet Protocol (IP) address or open ports to the Internet. The CDN Network Operations Command Center (such as NOCC 104 in FIG. 1) need not monitor it. The Extender also does not need to report into a distributed data collection service (such as system 108 in FIG. 1). Likewise, the CDN NOCC 103 would not need secure access (e.g., via SSH or the like) to the Extender for configuration, provisioning and/or administration. The NOCC would not need to install software updates to the Extender, and the Extender would not have to receive configuration data updates or other control data. It would not have to be under any mapping control provided by the CDN mapping services. In short, the Extender need not be managed as a service. Instead, and as will be described, the Extender is software or a device provided to the Network Operator, and it is up to that Network Operator to manage it and monitor it.

Although not necessarily managed or fully-managed as part of the CDN, the Extender preferably delivers all forms of CDN content (i.e., content that has been off-loaded by content providers for delivery by the CDNSP over the CDN). Further, the Extender can cache and deliver cacheable content, including on-demand media. It can also deliver un-cacheable content, secure content, and live media.

To deliver CDN content, the Extender acts under the control of the CDN. This control is necessary because, typically, it is desired (by the CDN customer) that the correct content be delivered according to customer metadata rules. In addition, the CDNSP desires to charge its customer (e.g., the content provider) for delivery of that content, even if it is delivered from the Extender's cache. Likewise, CDN customers (content providers) desire to monitor and report on the delivery of their content.

To facilitate this control, the Extender preferably communicates with a CDN resource (e.g., a fully-managed and configured CDN server), preferably on every request, and preferably using an HTTP-based application programming interface (API), sometimes referred to herein as an "information channel." Specifically, and according to the techniques herein, whenever the Extender receives a request for CDN content, regardless of whether it has that content cached already, preferably the Extender makes an HTTP request to a CDN server. The CDN server, which typically is fully-managed, then uses (applies) its metadata rules (for the content) and sends back an HTTP reply, instructing the Extender on how it should respond to the request that it received. Preferably, the CDN server's HTTP reply also includes the data to be delivered when needed and, when required, an appropriate cache-key to enable the Extender to correctly index that data object in its local cache. The CDN server (typically an edge server) also uses the information in the request to write a log (e.g., for billing and historical reporting), writes data into the data collection system 108 for real-time reporting, and performs any other necessary action.

In addition to serving CDN customer content, an Extender may provide transparent caching for cacheable non-CDN customer content. With transparent caching, an Extender is implemented in-line, receiving all HTTP requests for a set of end-users. In the case of requests for CDN content, the Extender uses the Extender API and behaves as described above. In the case of non-CDN content, the Extender acts like a traditional transparent cache. Unlike a traditional transparent cache, however, the Extender may use information (such as content length and a checksum) in addition to the URI to uniquely identify and cache a data object.

Figure 4:
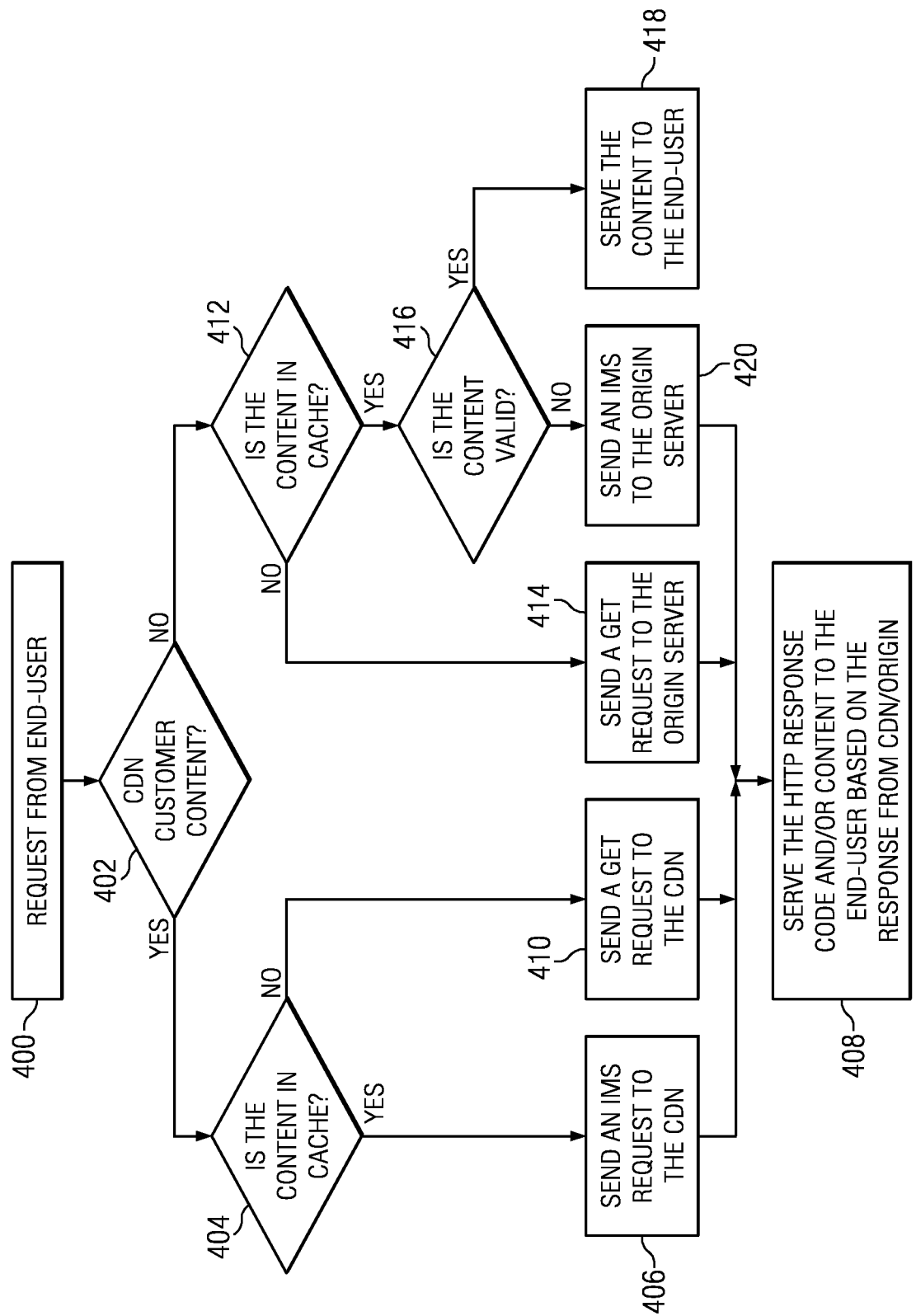
FIG. 4 illustrates how an Extender as described herein may interoperate with a CDN edge server according to this disclosure.

FIG. 4 illustrates a representative operation of the Extender operating in this "dual" manner to handle both CDN content, and non-CDN content. This operation is implemented in software, as a set of program instructions executed in a processor. The operation begins at step 400, when a request from an end-user is received at the Extender. As noted above, the Extender is located within or in association with a network that is distinct from the CDN overlay network, but the Extender has the capability of interoperating with the CDN via the Extender API. At step 402, a test is performed to determine whether the request is for CDN customer content. A simple technique for making this determination is described below with respect to FIG. 5, as will be described. If the outcome of the test at step 402 indicates that the request is for CDN customer content, the routine branches to step 404. At step 404, a test is performed to determine whether the requested content is present already in the Extender's cache. If so, the routine continues at step 406 by sending an if-modified-since (IMS) request to the CDN (and, in particular, a CDN edge server, as determined by the CDN DNS). Based on the response received from the CDN, the routine then continues at step 408 with the Extender serving to the requesting end-user an appropriate HTTP response code and/or the content request. If, however, the outcome of the text at step 404 indicates that the content requested is not in the Extender cache (or, if the content is present but is stale), the routine branches to step 410. At this step, the Extender sends an HTTP GET request to the CDN to fetch the content. Based on the response received from the CDN, the process continues with step 408 as described previously.

If the outcome of the test at step 402 indicates that the content requested is not CDN customer content, the routine branches to step 412. At this step, a test is performed to determine whether the content is in the Extender cache. If the outcome of the test at step 412 is negative, the Extender sends a GET request to the origin server (the authoritative entity). This is step 414. Based on the response, the routine continues at step in the manner previously described. If, however, the outcome of the test at step 414 indicates that the content is available to be served from the Extender's chance, a test is performed at step 416 to determine whether the content is valid. If so, the content is served to the requesting end-user at step 418. If the content is in the cache but not valid, the Extender sends an IMS to the origin server to determine whether the content can be validated. This is step 420. Based on the response, the routine then continues at step 408 in the manner previously described. This completes the process.

In this manner, the Extender serves as an intelligent transparent web proxy for non-CDN content while also serving (and, where appropriate, caching) CDN customer content. Step 402 in the process flow involves determining whether a domain associated with the end-user request belongs to a CDN customer. This domain may be included in an HTTP host header. A simple, yet efficient way to perform this determination is by having the Extender perform a DNS lookup on the domain. Typically, for a CDN customer, a top level domain (TLD) suffix of a canonical name (CNAME) will be a name that belongs to a set of one or more CDN edge traffic domains. By comparing the TLD domain of a final CNAME against a list of edge traffic domains (which should be relatively short, as such names will rarely change), the Extender can determine whether the content is CDN customer content or non-CDN customer content. FIG. 5 illustrates a sample DNS lookup on the customer domain " . . . bestbuy.com," with the result returning a final CNAME that includes a TLD suffix "akamai.net" associated with (i.e., identifying) the CDN. An alternative approach to performing the DNS lookup is to pass such information in HTTP headers, by publishing a list of edge traffic domains to which the Extender may subscribe, or the like. The above-identified approach (using the DNS lookup) is advantageous because the information (whether a customer has CNAMEd a particular domain to the CDN) can be propagated to every Extender instance within one DNS time-to-live (TTL), and further because a DNS lookup from the Extender also captures a content provider's geography-based policies for serving traffic.

As noted above, the Extender caches and serves the CDN customer content based on information it receives, in terms of content and cache-control instructions, from the CDN edge servers. Thus, in effect, the CDN (and, in particular, an edge server) acts as the "origin" server for the Extenders. Each time an Extender receives a request for a CDN customer's content (as determined by a DNS lookup as described above), the Extender goes forward to a CDN server (one of the IPs returned by the DNS lookup) to either fetch the content or, if the content is already in cache, to validate it (preferably, by IMS). By default, this forward request is done synchronously even for objects in the Extender's cache; in the alternative, the go-forward operation may be carried out asynchronously, e.g., at the request of the content provider, a network operator associated with the network in which the Extender is located, or the like. Preferably, and to enable the edge server to accurately log how many bytes were served to the end-user, the forward request from the Extender contains an appropriate HTTP header indicating whether the end-user had made an IMS request. When a partial object is served to the end-user, the Extender may make an HTTP POST request to the CDN edge server to accurately indicate how many bytes were served on the content provider's behalf.

When the CDN edge server responds to an Extender, preferably it communicates some or all available cache control information in one or more HTTP response headers. This cache control information includes, for example, time-to-live (TTL) expiration times, (when necessary) an appropriate cache-key specific to a content provider customer, whether an object is "no-store," whether a cached object should be purged (an explicit header is not needed for purge, as serving an HTTP 404 may signal to the Extender the object should be deleted from cache), and so forth. If desired, the CDN edge server may respond with headers that contain a list of objects that should be pre-fetched by the Extender. In addition, the CDN edge server may communicate specific metadata tags to the Extender to further customize its content handling operation. In yet another alternative, the CDN edge server includes a header that gives Extender hints regarding the popularity of an object; this information is then used in the Extender's cache-replacement algorithm.

Preferably, the Extender transparently caches and serves third-party content including, without limitation, user-generated content. If desired, the Extender may be configured to cache content from only a targeted set of (non-CDN) content providers. In this manner, the Extender provides a much higher cache-hit rate than an off-the-shelf transparent cache. To this end, the Extender preferably includes a web-based or command-line configuration interface by which an operator dynamically configures the list of domains, sub-directories, and content-types/file-extensions that should be cached by an Extender deployment. In one embodiment, this targeted transparent configuration is manually generated either by the network operator or by the CDN. The configuration may be the same or different for Extender instances in an operator's network.

By using a well-defined HTTP-based API, the Extender appears to the CDN much like an ordinary browser. In one embodiment, the HTTP requests from an Extender (to the CDN) are mapped to the nearest CDN edge server using conventional CDN-based mapping techniques, such as described in U.S. Pat. No. 6,108,703 and related patents, although this is not required. There may be other ways in which an Extender locates a particular CDN edge server or edge server cluster. If desired, the Extenders may use persistent connections and other optimized protocols in their communication with CDN servers. Persistent connections may be used for certain domains or classes of content. An example optimized protocol may be one in which TCP window sizes and RTOs are adjusted based on historical data, and so forth. An Extender may fetch content from multiple edge servers in parallel to maximize throughput.

Preferably, extenders are authenticated and authorized before they are permitted to interact with the CDN edge servers. This ensures that the CDN servers only deliver response to legitimate Extenders. An HMAC key exchange protocol may be used for this purpose. Likewise, preferably the CDN can audit Extender instances, revoking credentials if discovered to be illegitimate. To accomplish this, a test suite is evaluated against the API and a behavior specification that defines what it means to be a legitimate Extender. Extender credentials are given only to software or devices that pass the test suite, and credentials are revoked if that software or device later fails an audit with the test suite. In one non-limiting embodiment, the credential is in the form of a shared secret or a certificate, using standard mechanisms for authentication and authorization. The credential may include an identifier for each CDN Extender or family of Extenders. For example, all of the Extenders deployed in a given network may share a common identifier for reporting purposes. When these Extenders invoke the API, that identifier gets logged in the CDN, which then allows reporting, e.g., via a CDN extranet (such as a web-based, secure customer portal). The network operator can then access the portal and see a report showing how much traffic was delivered from the Extenders in its network. Preferably, all third-party traffic served by an Extender also is reported to the CDN (an edge server) so that it can be logged and later processed for reporting by the data collection system. To reduce the log volumes, data (in terms of edge requests and bytes served, origin requests and bytes fetched, etc.) is reported on an aggregate basis rather than reporting every single hit separately.

Preferably, an Extender supports network-specific protocol optimizations. In many cases, the network properties (bandwidth, latency, jitter, and the like) will be very different in the downstream segment (between the Extender and the end-user device) compared with the upstream segment (between the Extender and the CDN edge server to which the Extender gets mapped). By terminating TCP at the Extender, different TCP parameters and different optimizations can be applied between the two segments, thereby improving the overall throughput and efficiency.

An Extender also may have the capability of capturing low-level network information and passing it on to an application layer for the purposes of content adaptation or authentication. For example, an Extender that integrates into a mobile network may see low-level device information that is embedded in the mobile communication protocols. To obtain device identification and related information, the Extender has access to the network operator's control channel(s). In such case, the Extender may be configured to extract that information and include it in the HTTP API calls that the Extender then makes to the CDN. With the device information now in the HTTP headers, such information may be used in the CDN (or in the customer's origin infrastructure) to do content adaptation for the target mobile device.

Similarly, for authentication, an identifier (e.g., a SIM identifier) that is present in the low-level mobile communication protocols may be extracted and included in the HTTP API calls back to the CDN. With this identifier now in the HTTP headers, the identifier may be used as part of a customer's authentication system. These SIM identifiers strong authenticators and thereby allow a simple form of two-factor authentication. For example, in a mobile e-banking application, users could be authenticated by having the mobile device plus a password. Moreover, this integration at the HTTP layer means that the customer (the bank in this example) only has to do a single integration with the CDN. They would not have to do separate integrations with each mobile network operator.

Thus, when an Extender goes forward to a CDN edge server, the edge server can verify it is communicating with a legitimate Extender, and the edge server can identify the operator to which the Extender belongs.

An Extender may be implemented in a scaled down manner as a "micro-Extender." Once again, the nomenclature used herein should not be taken as limiting. Typically, a micro-Extender provides a subset of the basic Extender functionality, such as identifying requests for CDN content and forwarding those requests to a nearby CDN edge server. In the case of UMTS networks, with such a mechanism, the CDN-related requests would not have to go through the Packet Core to the Internet gateway, which might be very far away. Instead, the CDN-related requests could go to a much closer CDN server. In addition, the requests could include low-level protocol parameters, as described above.

A set of Extenders may be co-located or located near one another in a cluster, in which case a load sharing routine may be implemented across them. This would allow for a single location to have multiple Extenders either to handle additional load or for failover or both. No-store content may be fetched (e.g., over ICP) from an Extender in a cluster.

Figure 6:
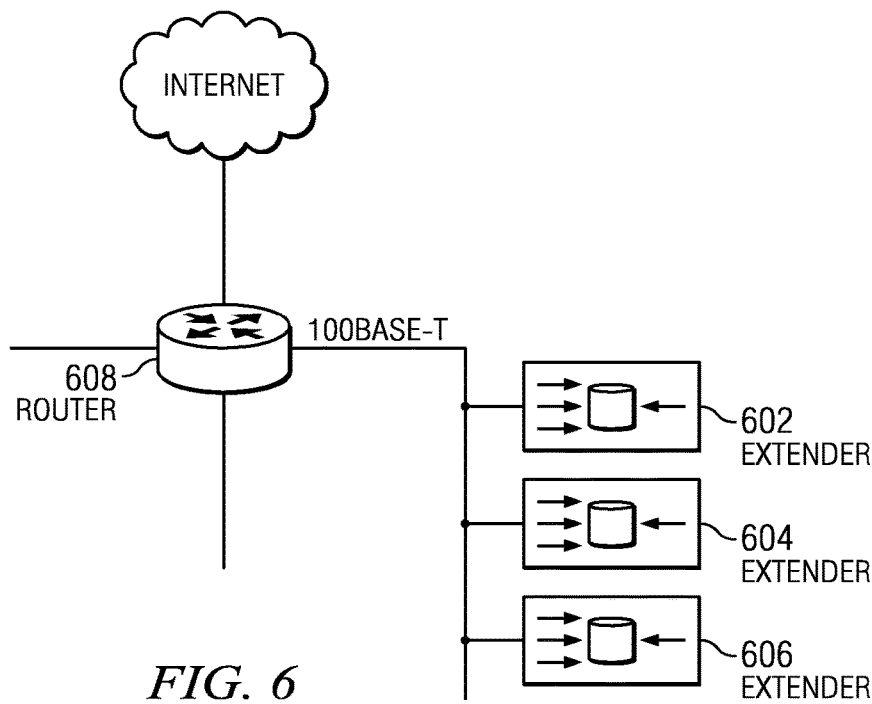
FIG. 6 illustrates multiple Extenders supported within a network.

More generally, a particular network implementation may use a number of different types of Extenders depending on how the operator desires to integrate into the target network and how traffic gets redirected. A simple integration uses DNS-based redirection. In this case, the Extenders receive only requests for CDN content. They would not perform transparent caching or pick up low-level protocol parameters. Another possible integration uses Web Cache Communication Protocol (WCCP) to redirect all HTTP requests on certain ports to the Extender. FIG. 6 provides a representative implementation using this technique. In this example, Extenders 602, 604 and 606, are associated with router 608 within the network. As is well-known, WCCP is the most commonly used method for directing traffic to transparent caching proxies. It allows one (WCCPv1) or more (WCCPv2) routers to use a cluster of caching servers as local content proxies. In a cluster of cache servers, one server is elected as the leader. This integration allows for transparent caching but not for picking up low-level protocol parameters. Finally, the integration could be done with the Extender directly in-line in the communication path. This integration requires specialization of the Extender to the protocol on that path. In such case, the Extender picks up low-level protocol parameters. This latter type of integration is convenient for deep within a network that is not otherwise accessible.

Figure 7:
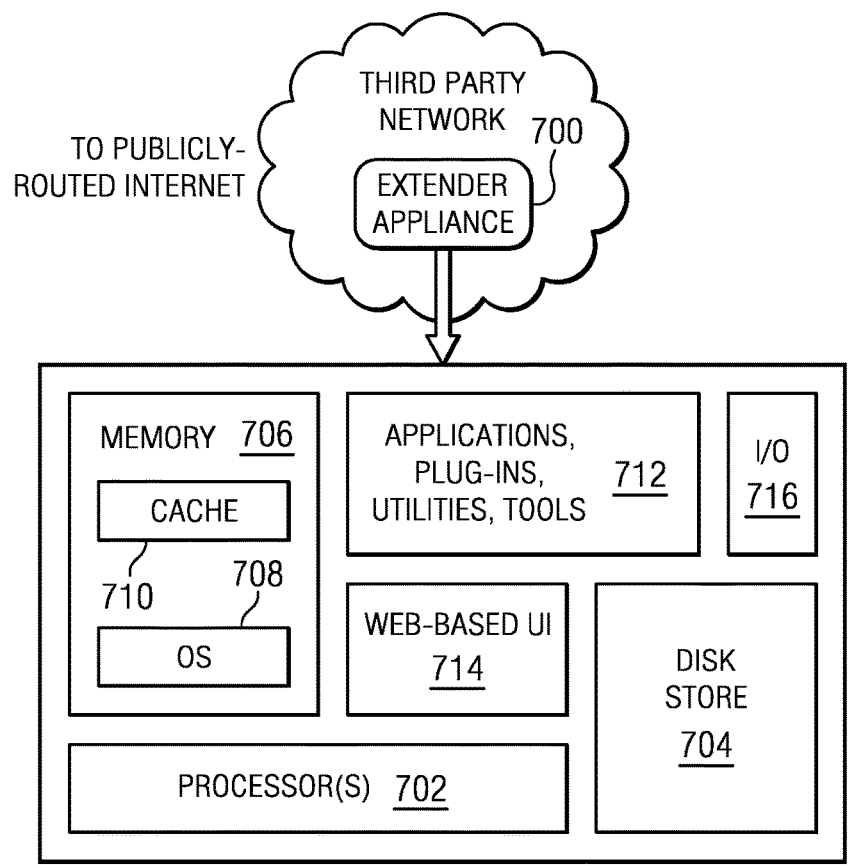
FIG. 7 illustrates a representative Extender architecture.

Each above-described process of the Extender preferably is implemented in computer software as a set of program instructions executable in one or more processors, as a special-purpose machine. Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described. FIG. 7 illustrates a representative Extender implemented as a rack-mounted hardware appliance. Extender 700 comprises one or more processors 702, disk store 704, memory 706, an operating system 708, a transparent connected cache 710, applications and plug-ins 712, a web-based configurator 714, and network I/O support 716. The transparent connected cache 710 may be implemented with known proxy caching software, such as Apache Traffic Server (an HTTP/1.1 compliant caching proxy server), as modified or controlled by the one or more applications 712 to provide the functionality described herein. The cache 710 may be sub-divided (partitioned) into a first portion for caching CDN customer content, and a second portion for caching non-CDN content.

Moreover, the subject matter herein is not limited for use with any particular type of telecommunications network, protocol or technology. For illustrative purposes only, the disclosure describes the invention in the context of a UMTS/GSM network as a representative mobile service provider's networking environment. The invention may likewise be implemented in a CDMA networking environment, or in or across other known or later-developed environments including, without limitation, Evolved Packet Core (EPC), 4G/LTE, WLAN (including WiFi), and the like. Likewise, the CDN embodiment is also exemplary, as other forms of CDN architectures (e.g., those that deploy large server clusters in a small number of data centers, those that locate servers near or at large peering points, etc.) may also interoperate with mobile or wireline networks in the manner described herein.

In an example scenario, the Extender is implemented within a UMTS 3G-compliant network in association with the operator's core network infrastructure (e.g., a mobile operator's gateway site, which may comprise an SGSN, a GGSN, and the like) and used to facilitate delivery of content (including CDN content) to mobile-connected devices (e.g., a smartphone or tablet).

As noted, preferably the Extender includes a web-based configuration interface that enables dynamic configuration management, e.g., by the network operator. This dynamic configuration includes a number of options. One option is the ability to specify which CDN customer content (specified as a list of domains and content types) is permitted to be cached. A default option is to cache all CDN customer content with overrides based on cache control instructions from the CDN edge servers. Another option is the ability to specify which third-party content (specified as a list of domains and content types) is permitted to be cached. A default option is to cache all third-party content. Yet another option is an option to partition disk cache space for CDN customer content versus third-party content, and/or to partition disk cache space for specific domains or sets of domains. Still another option is an option to partition the available throughput of the Extender to achieve desired levels/percentages of throughput for CDN customer content and third party transparently-cached content.

Preferably, a network operator can determine how much traffic the CDN is serving from the operator's Extender deployment. These reports are based on log or other data processed by the distributed data system. They may include, for example, total traffic served, CDN customer traffic vs. non-CDN customer traffic, traffic for identified websites, traffic breakdown by end-user geography, traffic breakdown by Extender cluster or geography, and the like. The Extender may export such data via SNMP or other network management software or systems.

As noted above, the Extender implements a cache. The cache is a transparently-connected (to the CDN) cache, as has been described. If desired, the Extender may implement cache eviction rates that are influenced by global popularity (based on information provided by the CDN), and operators may use the configuration interface to share popularity data generated in the Extender deployment. If desired, the CDN edge servers can be programmed to provide additional data to an Extender, such as network conditions, predictive data, content rules and the like, to influence the operation of the Extender with respect to both CDN and non-CDN traffic.

An Extender does not serve a response to a client if the CDN edge server would not have served the response to the client. Preferably, an Extender serves a response from its cache if the CDN edge server to which it is directed would have served the same response to the client. In the approach described above, an Extender queries the CDN edge server when there is a cache hit in the Extender; the CDN edge server (and, in particular, its web caching proxy) decides whether for that particular request Extender should use the cached content, or instead serve new content received from the CDN edge server. In this context, the business logic of deciding what is cacheable and for how long for any given request is implemented in the CDN edge server. In other words, Extender delegates the processing to the CDN. An alternative is to move some of the business logic to Extender so that it does not need to contact the CDN for every request. In this variant, the Extender gains some a priori knowledge of invariants in how the CDN edge server handles certain requests (and thus can take over that functionality itself), or it receives instructions (from the edge server) for how to perform such handling itself. In yet another alternative, Extender receives enough information from the CDN edge server to be able to independently decide for a client request if it is safe to serve a cached response to the client. If Extender cannot determine that it is safe to respond to the specific request from its cache, then it goes forward to the CDN. This approach may have limitations in situations when the information known to the CDN edge server changes after the edge server has already communicated it to Extender. To address this, a minimum frequency with which Extender revalidates cached content, overriding other considerations, may be imposed.

In one CDN-Extender operating scenario, if a CDN edge server can determine (according to customer metadata applicable to the requested URL) that the response only depends on the URL, the edge server preferably communicates the cacheability and remaining TTL of the fetched object to Extender in a response header. Extender then knows that it is safe to cache such an object for the duration of the remaining TTL. If, however, the CDN edge server cannot determine that the response depends solely on the request URL, it communicates that fact to Extender in a response header, in which case Extender may not cache the response. If the CDN edge server can determine (e.g., according to the customer metadata applicable to the requested URL) that the response is fully determined by the request URL and by specific request header fields, preferably the edge server lists the specific request header fields in a Vary response header. Any customer configuration in the CDN edge server in which a response-altering tag appears inside a match (condition) other than safe matches (such as a match on the Host request header, or on the URL) preferably causes the CDN edge server to set a special control bit in responses to Extender.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. Apparatus, comprising:
a hardware processor;
a cache;
computer memory holding computer program instructions that upon execution by the hardware processor cause the apparatus to perform steps comprising:
receiving a request for content;
in response to the request for content:
(i) determining whether the content is of a first type or a second type, the first type being content that is adapted to be delivered over a content delivery network (CDN) distinct from the apparatus, the second type being distinct from the first type;
(ii) when the content is of a first type and is located in the cache and is not stale, communicating with the CDN to receive a cache handling directive from the CDN, said communication being synchronous to the request for content, and applying the cache handling directive received from the CDN and serving the content in accordance therewith; and
(iii) when the content is of the second type, transparently caching and serving the content.

2. The apparatus as described in claim 1 wherein the step of receiving a cache handling directive comprises the following sub-steps:
receiving information identifying an edge resource in the CDN;
directing a validation request to the identified edge resource; and
receiving the cache handling directive in response to the validation request, the cache handling directive having been determined at the edge resource by applying customer-specific configuration data.

3. The apparatus as described in claim 1 wherein the cache is partitioned into first and second portions, the first portion for caching content of the first type, and the second portion for caching content of the second type.

4. The apparatus as described in claim 1 wherein the step of determining whether the content is of a first type compares a domain associated with the request with a list of CDN edge traffic domains.

5. The apparatus as described in claim 4 wherein the domain is a top level domain (TLD) of a canonical name (CNAME).

6. The apparatus as described in claim 1 wherein the cache handling directive received from the CDN is one of: a time-to-live (TTL) expiration time, a "no-store" directive, and data indicating if the content should be purged from the cache.

7. The apparatus as described in claim 1 wherein the steps further include authenticating the cache to the CDN.

8. The apparatus as described in claim 1 wherein the steps further include providing data to the CDN.

9. The apparatus as described in claim 8 wherein the data identifies data of the first type served from the cache, and data of the second type served from the cache.

10. The apparatus as described in claim 1 wherein the cache handling directive includes a cache key uniquely associated with a particular domain associated with a CDN customer.

11. A content delivery method carried out in association with a third party content delivery network (CDN), the CDN comprising a set of edge servers, and a domain name service (DNS) authoritative for one or more content provider domains served by the CDN, the method comprising:

deploying a cache in a network distinct from the CDN;

establishing an information channel between the cache and at least one edge server; and using the information channel to control how content associated with the content provider domains and located in the cache is served from the cache;

wherein, in response a given content request: when the given content request is for content associated with the one or more content provider domains, and the given content is present in the cache and is not stale, the cache communicates with the CDN synchronously to the given content request and via the information channel to receive at least one cache handling directive from the CDN to control how the given content is served from the cache.

12. The method as described in claim 11 wherein the network is a mobile network.

13. The method as described in claim 11 wherein the network is a wireline network.

14. The method as described in claim 11 further including transparently caching and serving from the cache content associated with domains other than the content provider domains.

15. The method as described in claim 11 wherein the cache extends the content delivery network into the network.

* * * * *